7404X
T. W. WHITLEY.
Measuring and Transferring Liquids.
Patented Feb. 1, 1833.
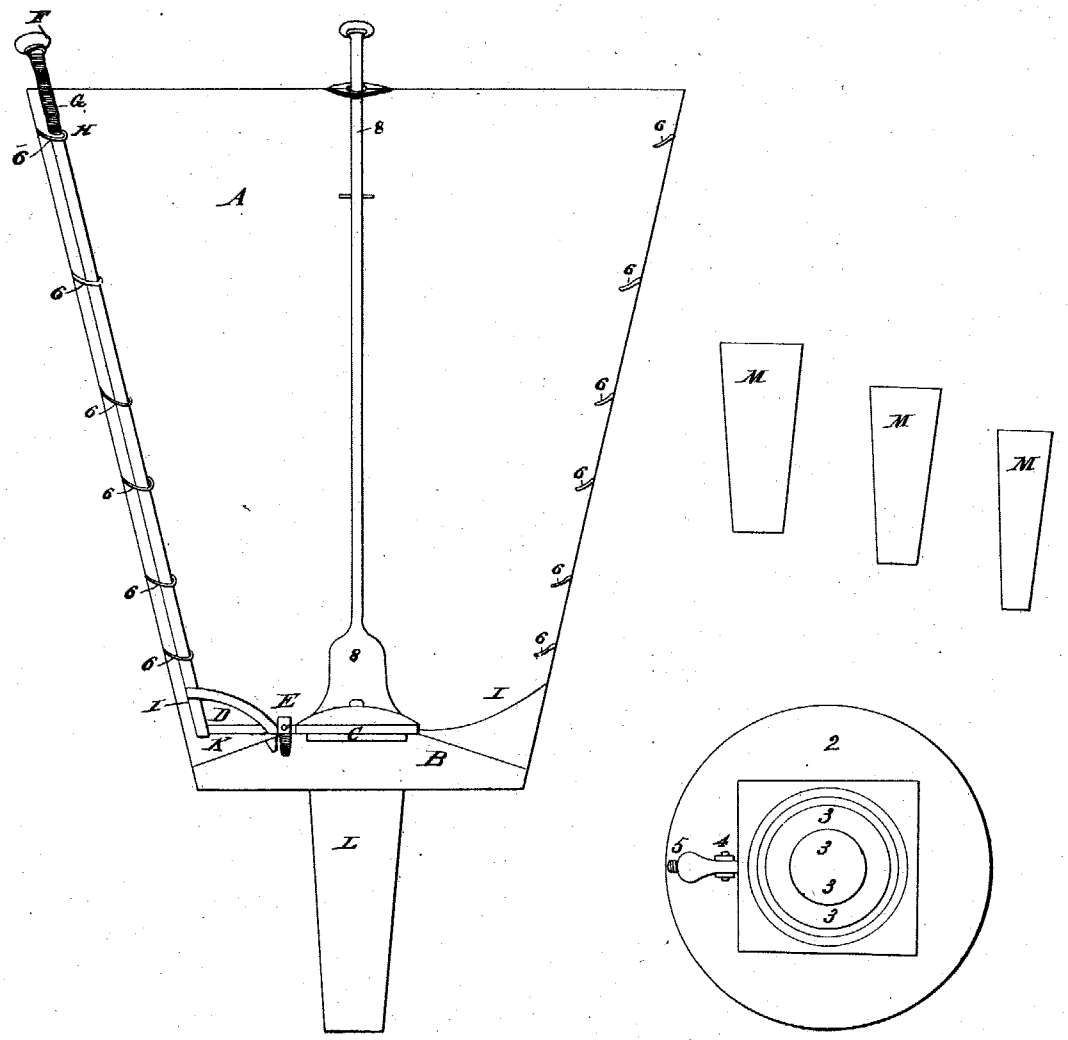
THE NORRIS PETERS CO., PHOTO-LITHO., WASHINGTON, D. C.

Thomas W. Whitley. Patterson New Jersey.

Letters Patent.

The Schedule referred to in these Letters Patent and making part of the same, containing a description in the words of the said Thomas W. Whitley himself of his improvement in the measuring and transferring liquids.

To all to whom these presents shall come.

Be it known that I Thomas W. Whitley of Patterson, in the county of Essex & state of New-Jersey, have invented a new & useful improvement in measuring & transferring Liquids, that the following is a full and exact description of the construction & operation of the said Machine as invented by me.
In the drawing accompanying this specification A. is a vessel containing an indefinite quantity of liquid B. the bottom of said vessel thro' which is an aperture containing a pipe for the transfer of the liquid C. is a valve by which the aperture is closed when drawing the liquid into the vessel A. D. is a lever turning on the fulcrum E. by which the valve is elevated on the application of pressure to the top of the rod F. G. is a spiral spring attached to the end of the rod F. descending the rod to the flange or rim. H. I.I. denotes the shape of the bottom of the vessel K. denotes the depression of the lever D. L. is a tunnel or pipe passing thro' the centre of the bottom of the vessel A. to convey the liquid to another vessel M. M. are different pipes adapted to the apertures of vessels to be filled.
No. 2. is the inside bottom of the vessel. 3. is the valve. 4. is the fulcrum 5. is the end of the lever fastened to the valve & to which lever the perpendicular rod will be attached at the end. 6.6.6.6. designate a number of small rims around the inside of the vessel A. which are so arranged as to determine the quantity contained in Dr. co. [illegible]

1404x in the vessel A. at the level of each rim. The object of the above machine is to measure & transfer liquids from one vessel to another, without the liability of loss, & preventing entirely the filth & waste generally attendant on such business, the machine to be made of wood, copper, tin, block tin, or any other material, that will be best adapted to its several uses.

Exd. Witnesses
WH A Reynolds
A. S. Pennington } (Dr in portfolio)

Thomas W. Whitley.

[455 Words